(12) United States Patent
Mizumachi et al.

(10) Patent No.: US 6,434,207 B1
(45) Date of Patent: Aug. 13, 2002

(54) INSPECTION METHOD AND APPARATUS FOR PIPING

(75) Inventors: Yuuichirou Mizumachi, Tokai-mura; Makiko Miyauchi; Masakazu Hisatsune, both of Hitachi; Fuminobu Takahashi, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/492,126

(22) Filed: Jan. 27, 2000

(51) Int. Cl.⁷ ................................................ G21C 17/00
(52) U.S. Cl. ........................ 376/245; 376/248; 376/249; 73/636; 73/638
(58) Field of Search ................................. 376/262, 260, 376/249, 245, 250, 248; 73/598, 600, 622, 636, 638

(56) References Cited

U.S. PATENT DOCUMENTS

| | | | | |
|---|---|---|---|---|
| 3,511,091 A | * | 5/1970 | Thome | 73/343 |
| 3,930,942 A | * | 1/1976 | Thome | 176/87 |
| 4,336,104 A | * | 6/1982 | Figlhuber et al. | 376/249 |
| 4,375,165 A | * | 3/1983 | Sterke | 73/622 |
| 4,385,573 A | * | 5/1983 | Gugel et al. | 73/640 |
| 4,795,606 A | * | 1/1989 | Fenemore et al. | 376/248 |
| 4,801,422 A | * | 1/1989 | Turner et al. | 376/260 |
| 4,825,769 A | * | 5/1989 | Watts | 376/260 |
| 5,982,839 A | * | 11/1999 | Hatley | 376/249 |

FOREIGN PATENT DOCUMENTS

| | | |
|---|---|---|
| JP | 6-27092 | 2/1994 |
| JP | 9-304303 | 11/1997 |

\* cited by examiner

*Primary Examiner*—Harvey E. Behrend
(74) *Attorney, Agent, or Firm*—Mattingly, Stanger & Malbur, P.C.

(57) ABSTRACT

Nuclear fuels are taken from a nuclear reactor pressure vessel, a rail for running is mounted under the reactor pressure vessel drain piping in parallel with a horizontal portion of the reactor pressure vessel drain piping inside a pedestal positioned on the lower side of the reactor pressure vessel, an inspection apparatus is mounted on the rail, and the inspection apparatus is moved along the rail to inspect the reactor pressure vessel drain piping, whereby the reactor pressure vessel drain piping can be surely inspected while reducing radiation exposure to an inspector.

4 Claims, 11 Drawing Sheets

ENTER PEDESTAL AT INLET

CARRY IN PLATE TYPE RAIL INTO PEDESTAL

HAND PLATE OVER OPPOSITE SIDE WHILE EXTENDING THE PLATE

FIXING BOTH ENDS BY FIXING BELTS

INSPECTION METHOD AND APPARATUS FOR PIPING

BACKGROUND OF THE INVENTION

The present invention relates to an inspection method of piping in a nuclear power plant and, more particularly, to a method and apparatus for inspecting reactor pressure vessel drain piping inside a pedestal on the lower side of the reactor pressure vessel.

As a conventional pipe inspection method (non-destructive inspection technique) in a nuclear power plant, a method using X-ray transmission and RT (radiographic test) calculation tomography (CT) is disclosed in JP A 9-304303. Further, JP A 6-27092 discloses an ultrasonic test (hereunder, referred to as UT), using an apparatus which is absorbed on piping by utilizing suction force of a vacuum pump and moves.

When the above-mentioned conventional technique is applied for inspection of reactor pressure vessel drain piping inside a pedestal in a nuclear power plant, the following problems occur.

Several hundred control rod drive housings each fixed to the reactor pressure vessel stand inside the pedestal, and a distance therebetween is about 145 mm and narrow. Cables for operating the control rod drives are connected to lower sides of the control rod drive housings. An automatic exchanger of the control rod drives is disposed on the bottom of the pedestal, and there is little gap between the cables and the automatic exchanger. Further, a gap between the reactor pressure vessel drain piping and the ceiling of the pedestal is only about 300 mm, and an elbow portion to be inspected, which is a part of the reactor pressure vessel drain piping, is disposed at a central portion separated about 2 m from a side wall of the pedestal. Further, an ambient atmospheric dose is high, being influenced by deposits in reactor water, so that it is difficult to work inside the pedestal (particularly at the central portion) for a long time.

In this manner, the reactor pressure vessel drain piping inside the pedestal is disposed in surroundings in which it is very difficult for person to approach and directly inspect. When the conventional technique disclosed in JP A 9-304303 is applied thereto, the inspection apparatus is moved in manual, so that it is necessary for an inspector to approach to the reactor pressure vessel drain piping to be inspected and install the inspection apparatus. Therefore, it is impossible to really apply this conventional technique thereto.

Further, in the case where the conventional technique disclosed in JP A 6-27092 is applied, it is necessary to cause the inspection apparatus to be absorbed to the reactor pressure vessel drain piping, however, since the drain piping has metal heat insulator wound thereon and the heat insulator has a convex and concave shape formed on the surface thereof, sufficient absorption force can not be obtained and there is the possibility that the inspection apparatus is fallen during the inspection. That is, it is difficult to surely inspect the drain piping with high reliability.

SUMMARY OF THE INVENTION

An object of the present invention is to provide an inspection method and an inspection apparatus for piping, each of which is able to surely inspect reactor pressure vessel drain piping inside a pedestal in a nuclear power plant while reducing exposure of radiation to an inspector.

In the present invention, nuclear fuels are taken out from a nuclear reactor pressure vessel, a rail for running is mounted under reactor pressure vessel drain piping in parallel with a horizontal portion of the reactor pressure vessel drain piping inside a pedestal positioned on the lower side of the reactor pressure vessel, an inspection apparatus is mounted on the rail, and the inspection apparatus is moved along the rail to inspect the reactor pressure vessel drain piping.

Under the condition that the nuclear fuels are taken out from the inside of the reactor pressure vessel, the rail and the inspection apparatus each are mounted, whereby it is possible to reduce exposure of radiations to an inspector. Further, the reactor pressure vessel drain piping can be surely inspected by moving the inspection apparatus along the rail mounted under the drain piping in parallel to the horizontal portion of the drain piping.

Preferably, the rail is mounted at a peripheral portion inside the pedestal.

The exposure of radiations to the inspector can be further reduced by mounting the rail at the peripheral portion inside the pedestal.

Further, preferably, the inspection apparatus is provided with a mechanism for preventing the inspection apparatus from being fallen from the rail.

The reactor pressure vessel drain piping can be surely inspected by providing the mechanism for preventing the inspection apparatus from being fallen from the rail.

Further, preferably, the rail is fixed to control rod drive housings.

The rail is sufficiently fixed without providing any new fixing member.

In another invention, nuclear fuels are taken out from a nuclear reactor pressure vessel, an inspection apparatus is mounted on a beam preset under reactor pressure vessel drain piping in parallel with a horizontal portion of the reactor pressure vessel drain piping inside a pedestal positioned on the lower side of the reactor pressure vessel, and the inspection apparatus is moved along the beam to inspect the reactor pressure vessel drain piping.

Since the beam preset under the reactor pressure vessel drain piping is used as a rail for traveling the inspection apparatus, the work can be simplified in addition to the above-mentioned effects.

Another invention comprises a carriage set on a rail arranged under reactor pressure vessel drain piping in parallel with a horizontal portion of the drain piping inside a pedestal, a driving means for moving the carriage along said rail, a falling prevention mechanism for preventing the carriage from falling from the rail, a camera mounted on the carriage and monitoring a relative position between the camera and the drain piping, and a thickness measuring means mounted on the carriage and measuring the thickness of the drain piping.

Preferably, a control means for controlling the driving means, a displaying means for displaying an image monitored by the camera and an outputting means for outputting a measurement result obtained by the thickness measuring means are provided for installation outside the pedestal. Thereby, the reactor pressure vessel drain piping can be inspected by remote operation from the outside of the pedestal.

BRIEF DESCRIPTION OF THE DRAWINGS

FIG. 3b is a perspective view of an elbow portion of reactor pressure vessel drain piping inside the pedestal in FIG. 3a;

FIG. 3c is a rough plane view of the inside of the pedestal shown in FIG. 3a;

FIG. 4d is a perspective view of a carriage set on the rail in FIG. 4a;

FIG. 7b is a front view of a wheel mounted on the carriage, indicated by A in FIG. 7a;

FIG. 7c is a side view of the portion of the carriage, indicated by A in FIG. 7a;

FIG. 8b is a side view of a part of the inspection apparatus shown in FIG. 8a;

FIG. 8c is a plane view of the inspection apparatus in FIG. 8a;

FIG. 10b is a side view of the inspection apparatus in FIG. 10a;

FIG. 10c is a plane view of the inspection apparatus in FIG. 10a;

FIG. 10d is a sectional view of an ultrasonic probe construction of the inspection apparatus shown in FIG. 10a;

FIG. 11b is a plane view of FIG. 11a.

DESCRIPTION OF EMBODIMENTS OF THE INVENTION

Figure 2:
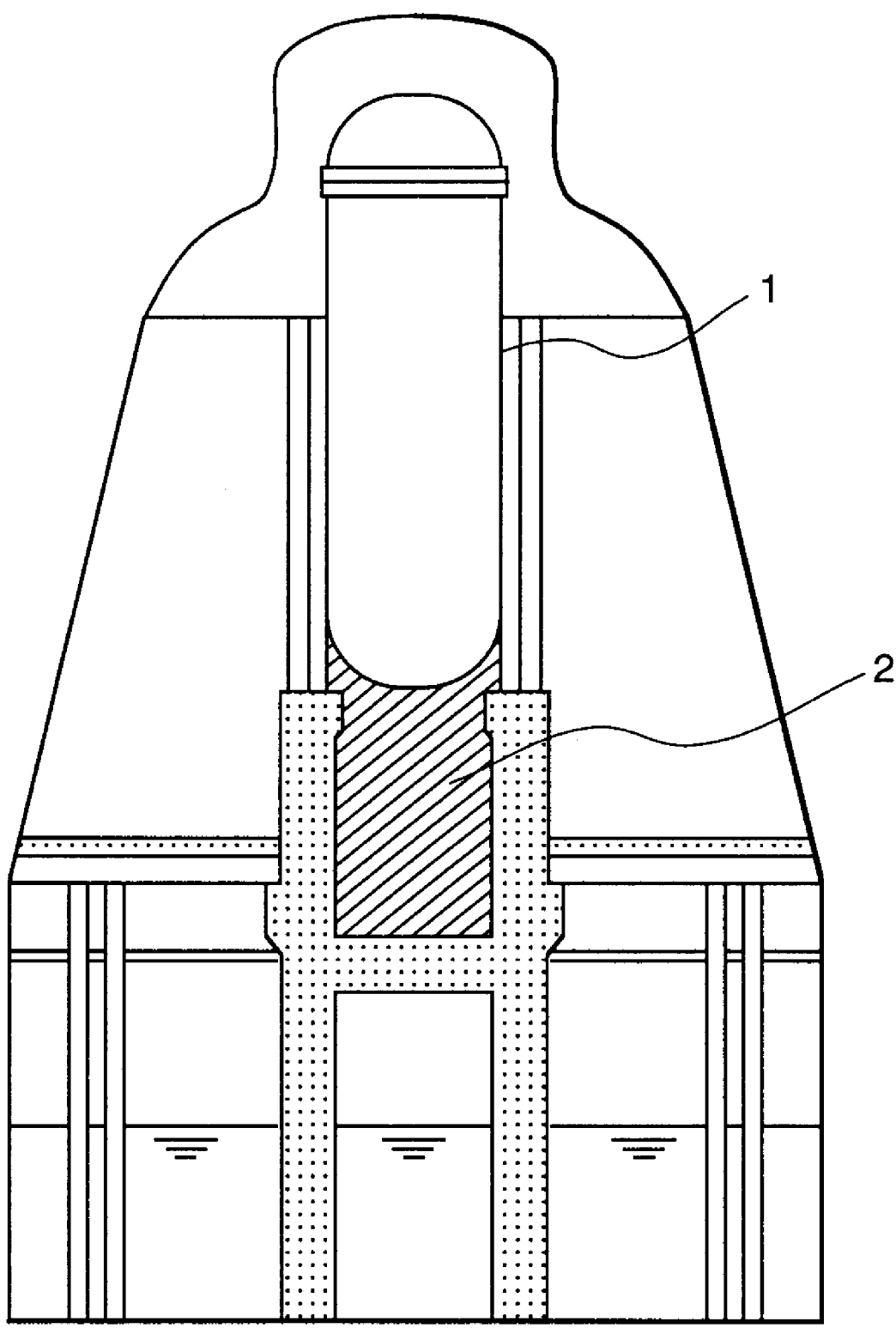
FIG. 2 is a rough vertical sectional view of the inside of a reactor pressure vessel.
Figure 3A:
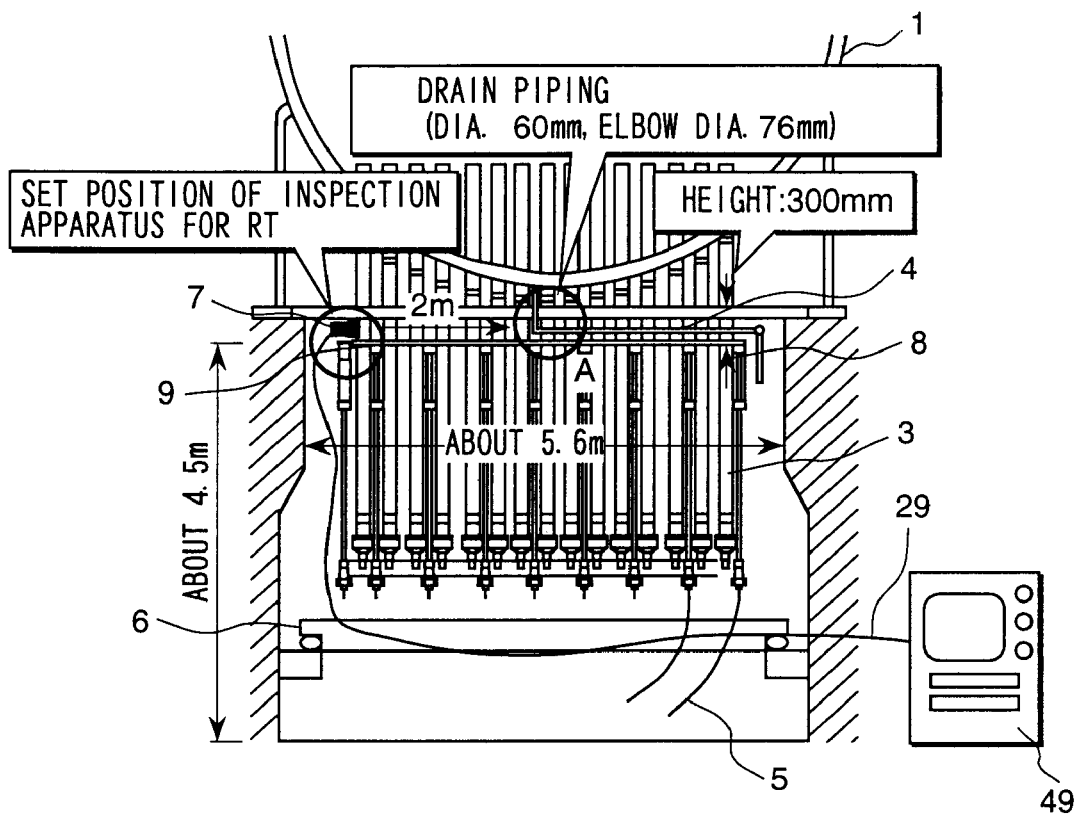
FIG. 3a is a rough vertical sectional view of the inside of a pedestal.

First, surroundings in which reactor pressure vessel drain piping to be inspected is provided inside a pedestal will be explained. FIG. 2 is a rough vertical sectional view of the inside of a reactor pressure vessel, and FIG. 3a is a rough vertical sectional view of the inside of the pedestal. As shown in FIG. 2, the pedestal 2 is positioned on the lower side of the cylindrical reactor pressure vessel 1 in a reactor primary containment vessel.

As shown in FIG. 3a, the pedestal 2 is a columnar space of diameter of about 5.6 m, height of about 4.5 m, for instance. Several hundred control rod drive housings 3 each fixed to the reactor pressure vessel 1 stand inside the pedestal 2, the distance therebetween is about 145 mm which is narrow. Cables 5 for operation of the control rod drives are disposed under the respective control rod drive housings 3 and each connected thereto. A control rod drive automatic exchanger 6 is provided on the bottom of the pedestal 2.

Figure 3B:
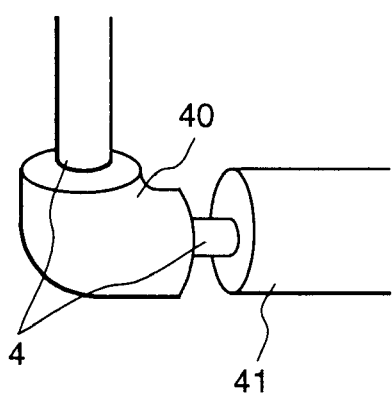

The reactor pressure vessel drain piping 4 for discharging reactor water is connected to the bottom (reactor bottom portion) at a central portion of the reactor pressure vessel 1. The reactor pressure vessel drain piping 4 extends vertically downwards from the reactor bottom portion, changes the direction to a horizontal direction through an elbow socket 40 positioned at a slightly lowered position (refer to FIG. 3b) and extends horizontally toward the side wall of the pedestal 2. For example, the reactor pressure vessel drain piping 4 has a diameter of about 60 mm and the elbow socket 40 has a diameter of about 76 mm. A horizontally extending portion (horizontal portion) of the reactor pressure vessel drain piping 4 is covered with heat insulator 41. A gap between the reactor pressure vessel drain piping 4 and the ceiling of the pedestal 2 is about 300 mm, and the elbow portion to be inspected of the reactor pressure vessel drain piping 4 is positioned at a central portion separated away about 2 m from the side wall of the pedestal 2.

Figure 1:
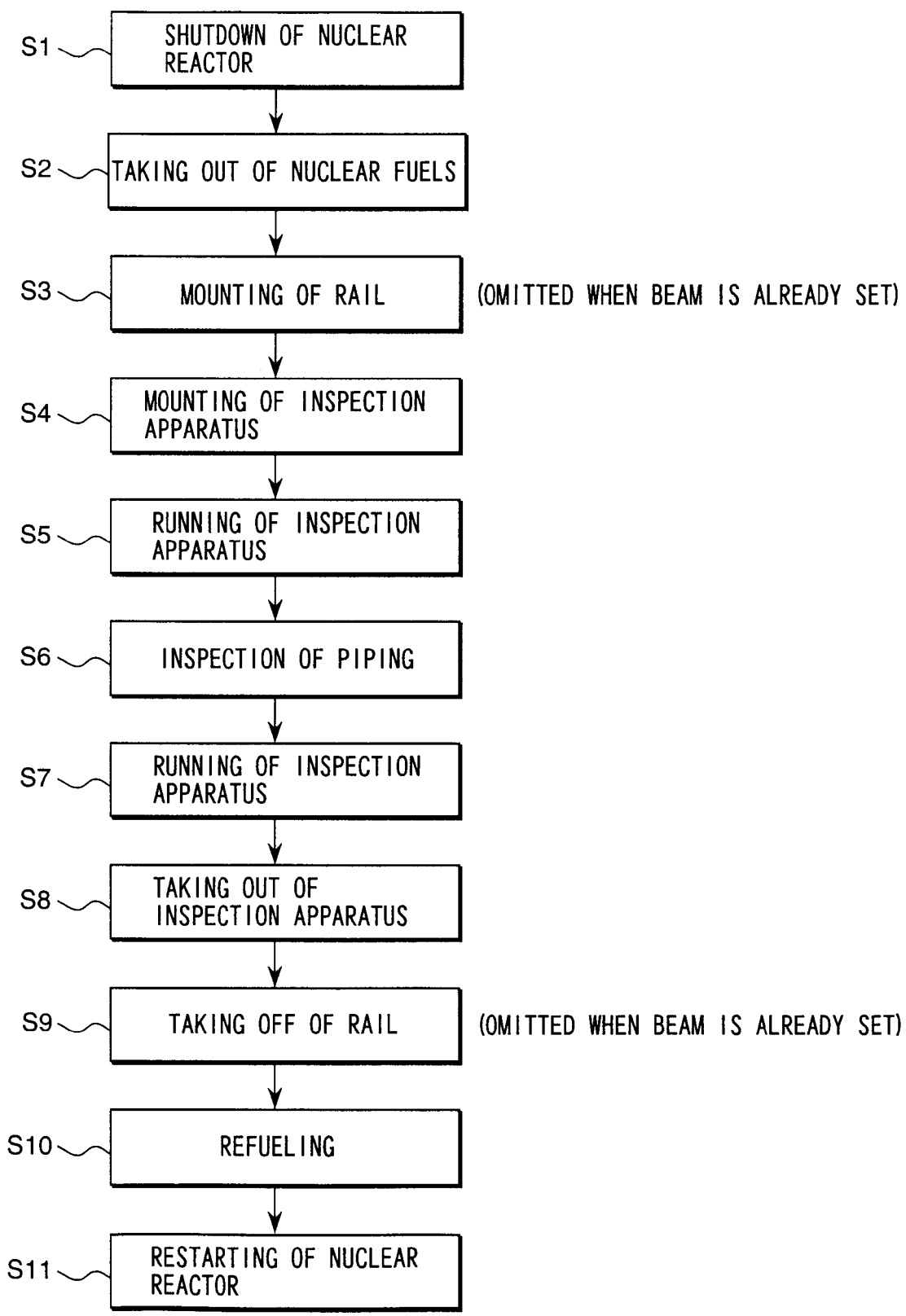
FIG. 1 is a flow chart showing an embodiment in which an inspection method of piping according to the present invention is applied to reactor pressure vessel drain piping inside a pedestal in a nuclear power plant.

An embodiment of the present invention will be explained hereunder, referring to drawings. FIG. 1 is a flow chart showing an embodiment that an inspection method of piping according to the present invention is applied to the reactor pressure vessel drain piping inside the pedestal in the nuclear power plant.

Figure 3C:
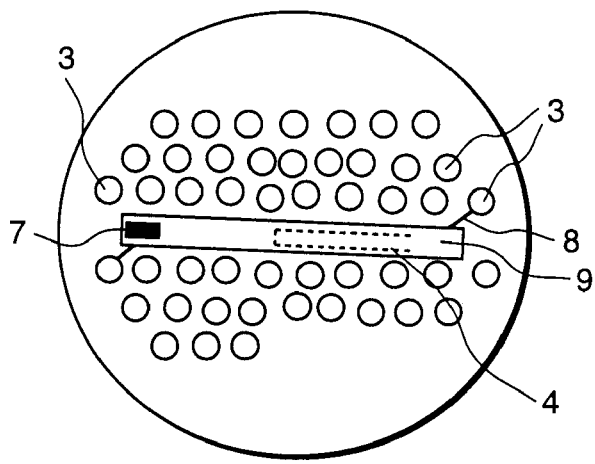

First, in FIG. 1, the reactor is shutdown at step S1, the reactor pressure vessel 1 is opened and nuclear fuels are taken out and moved to a nuclear fuel pool adjacent to the reactor pressure vessel 1 at step S2. A rail 9 (railway) for traveling an inspection apparatus is mounted in the vicinity of the reactor pressure vessel drain piping 4 inside the pedestal 2. As shown in FIGS. 3a and 3c, the rail 9 is mounted, under the reactor pressure vessel drain piping 4, in parallel with the horizontal portion of the reactor pressure vessel drain piping 4.

The rail 9 has length extending from one portion of the side wall inside the pedestal 2 to the opposite portion (in FIGS. 3a and 3c, from a left end to a right end), and both ends of the rail 9 are fixed to the control rod drive housings 3 adjacent to the both ends by fixing belts 8. In this manner, by fixing the rail 9 to the control rod drive housings 3, it is unnecessary to provide any new fixing members.

An example of the rail 9 is shown in FIGS. 4a to 4d. The rail 9 is made in a multi-layer structure (plate type) in which several plates 10 of light-weight material such as plastic material are laminated and then a magnetic metal plate 11 is laminated thereon. In this case, wheels 32 magnetically adhered to the metal plate 11 can be used as wheels of a running carriage 7a of the inspection apparatus. Falling of the carriage 7a from the rail 9 can be prevented by providing the wheels 32 with auxiliary wheels 33. Further, remote operation can be done by controlling a drive motor of the wheels 32 through a cable 29.

Figure 4A:
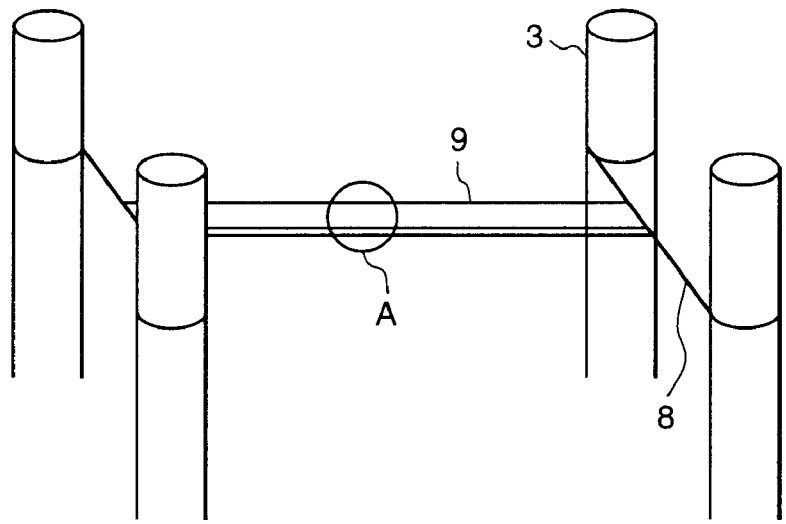
FIG. 4a is a perspective view of an example of a rail for running.
Figure 4B:
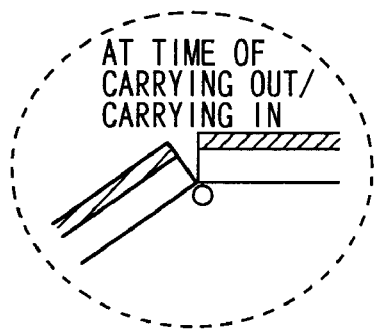
FIG. 4b is a view of "A" portion of FIG. 4a, showing the rail when it is carried in/out.
Figure 4C:
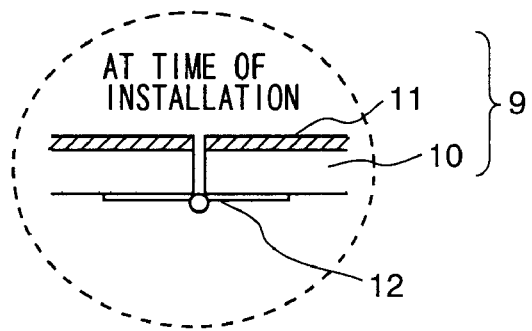
FIG. 4c is a view of "A" portion of FIG. 4a, showing the rail when it is set.
Figure 4D:
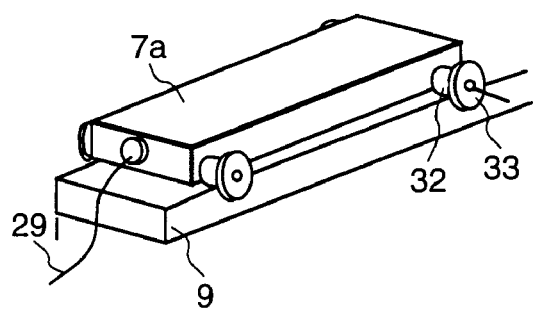

Here, an example of mounting procedures of the plate type rail 9 will be explained, referring to FIGS. 5a to 5d. First, in FIGS. 5a and 5b, the plate type rail 9 folded is carried in at an inlet 2a of the pedestal 2. The rail 9 has a butt hinge 12 connecting each plate 10 and can fold up when it is carried in as shown in FIGS. 4b and 4c. Therefore, the rail 9 can be carried in without interference with structures inside the pedestal 2.

Figure 5A:
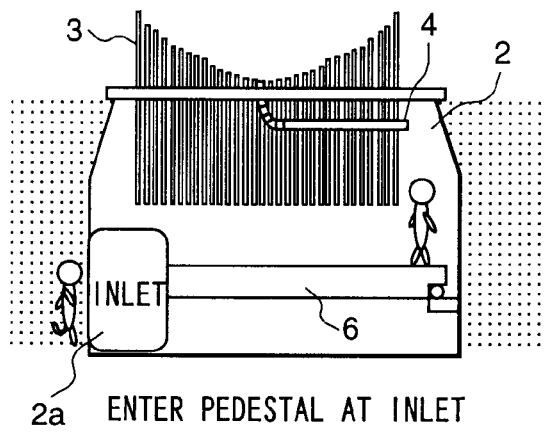
FIGS. 5a to 5d each are a view showing a mounting procedure of the plate type rail.
Figure 5B:
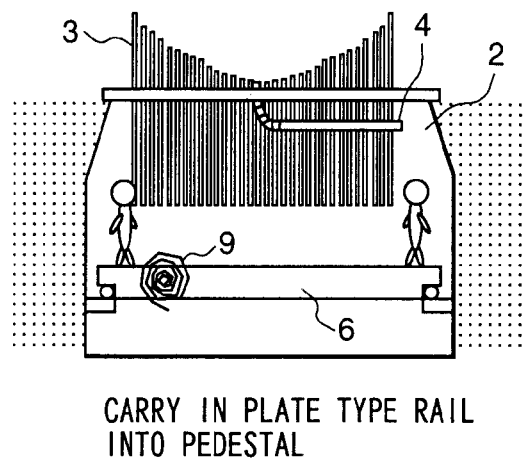
Figure 5C:
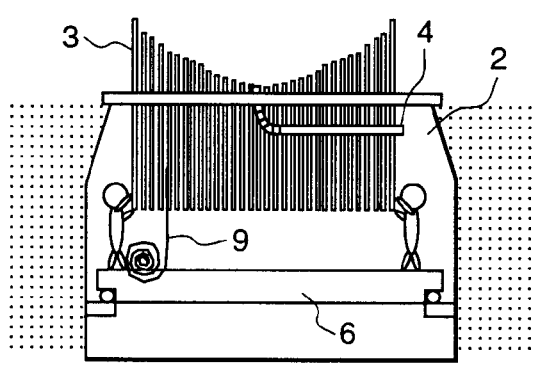
Figure 5D:
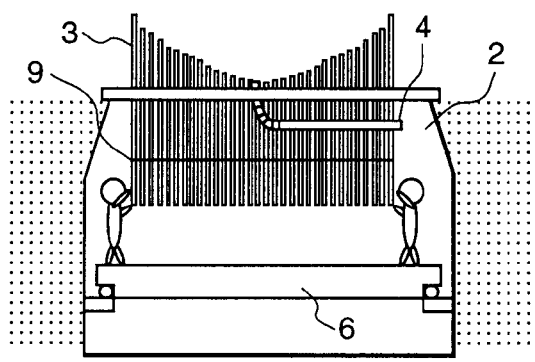

Next, in FIG. 5c, the folded rail is extended from the one side (left side) in the pedestal 2 to the opposite side (right side). In FIG. 5d, the fixing belts 8 attached to the both ends of the rail 9 are fixed to the control rod drive housings 3, thereby to fix the rail 9. The fixing belts 8 each are made of rubber, and dampers are mounted on the sides (insides) adhered to the control rod drive housings 3.

The control rod drive automatic exchanger 6 of height about 2 m from the bottom is installed in the lower portion of the pedestal 2, and rotates 360° in the peripheral direction. Therefore, since an inspectorll can move (along the side wall) in the peripheral direction in the pedestal 2, a mounting position of the rail 9 is not limited to any specific position as long as it is inside a gap (space) between the side wall of the pedestal 2 and the control rod drive housings 3. Further, by mounting the butt hinge 12 on the lower side of the rail 9, the rail 9 does not fold even if the load of the inspection apparatus is applied on the upper surface of the rail.

Another example of the rail 9 will be explained, referring to FIGS. 6a to 6c. In this case, wires are used instead of the plates of the plate-type rail. First, fixing frames 13 and 14 for fixing wires which are used as a rail, are arranged as shown in FIG. 6c. The fixing frames 13, 14 are mounted on the control rod drive housings 3 positioned peripheral portions (around the side wall) inside the pedestal 2 in the direction that the horizontal portion (horizontal direction in FIG. 6c) of the reactor pressure vessel drain piping 4 extends, as in FIGS. 3a, 3c.

Figure 6A:
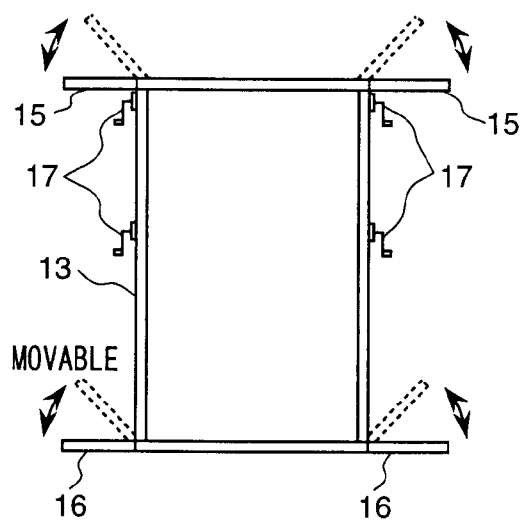
FIGS. 6a and 6b each are a view of another example of the rail.
Figure 6B:
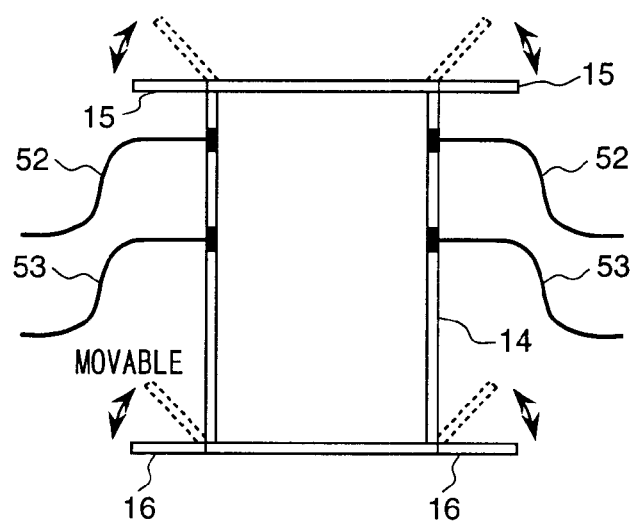
Figure 6C:
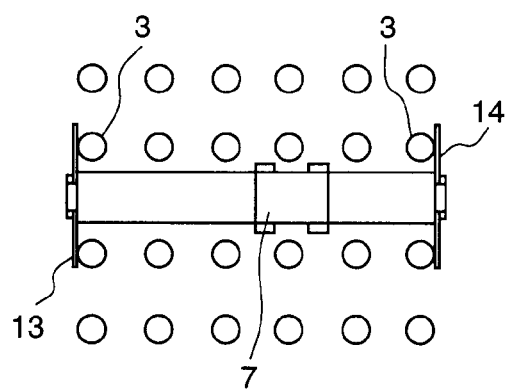
FIG. 6c is a plan view of the rail shown in FIGS. 6a and 6b.

As shown in FIG. 6a, the fixing frame 13 is provided with wire winding winches of 4 in total, two winches at two positions on the upper side and two winches at two positions on the lower side. As shown in FIG. 6b, the fixing frame 14 has 4 wires in total, attached thereto in advance, which are two upper wires 52 and two lower wires 53. In FIG. 6c, the fixing frame 13 and the fixing frame 14 are installed so that the positions of the winches 17 of the fixing frame 13 oppose the upper wires 52 and lower wires 53 of the fixing frame 14. Under this condition, the upper wires 52 and lower wires 53 of the fixing frame 14 are extended to the corresponding winches 17 of the fixing frame 13, and the wire type rail 9 is formed by tightly pulling the wires.

The fixing frames 13, 14 each are provided with an upper stopper 15 and lower stopper 16. The upper stopper 15 and lower stopper 16 each are movable as shown by arrows in FIGS. 6a and 6b, and the fixing frames 13 and 14 can be carried, with the stoppers 15, 16 being folded when they are carried into the pedestal 2. Further, tension of each of the wires can be adjusted by the winches 17 of the fixing frame 13 to be strong or weak. In FIGS. 6a to 6c, stoppers for engaging the fixing frames 13, 14 with the control rod drive housings 3 to fix the fixing frames are omitted.

Figure 7A:
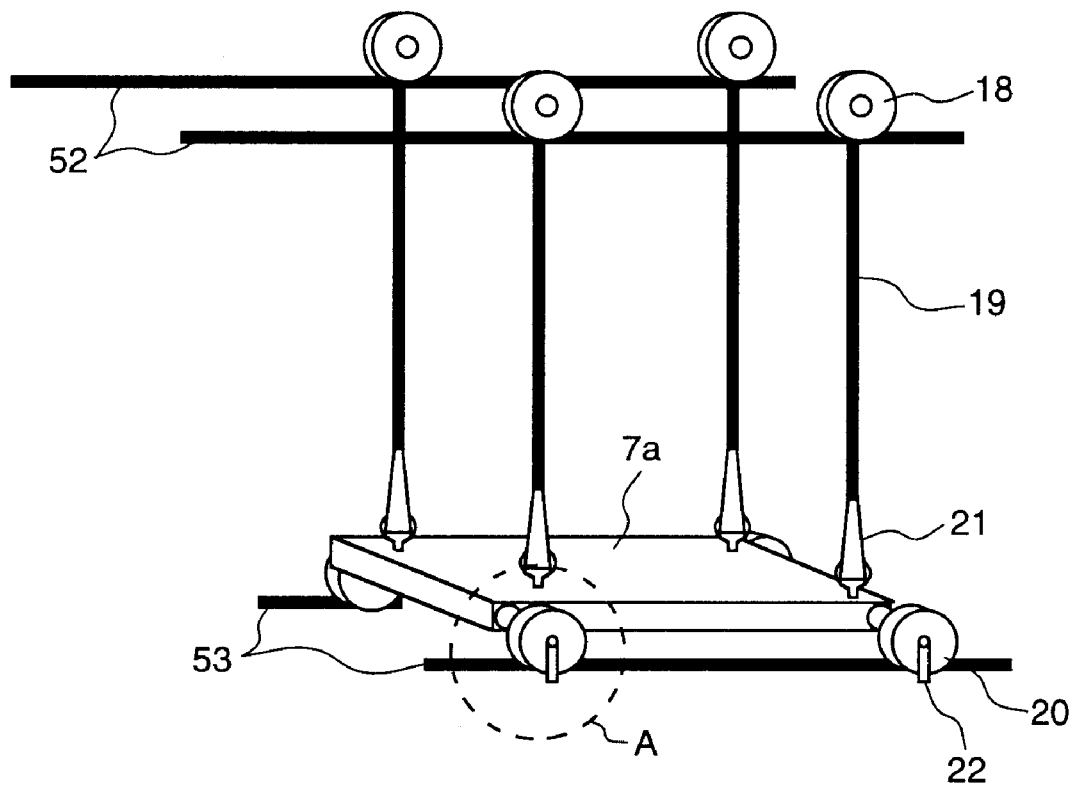
FIG. 7a is a perspective view of a carriage of inspection apparatus mounted on the wire type rail.
Figure 7B:
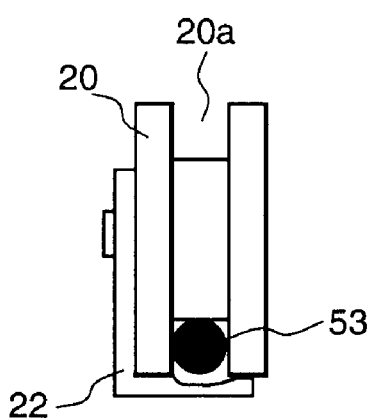
Figure 7C:
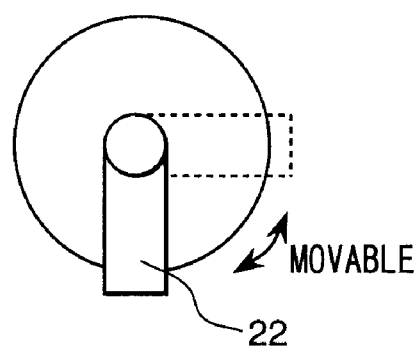

FIGS. 7a to 7c show the condition that the carriage 7a for the inspection apparatus is mounted on the wire type rail. As shown in FIG. 7a, the carriage 7a is provided with detachable hooks 21 at four corners. Hang wires 19 each extend vertically upward from the hook 21, and a pulley 18 is provided on an end of each hang wire 19. The pulleys 18 are engaged on the upper wires 52, whereby the carriage 7a can move on the upper wires 52 in parallel with the upper wires 52. As shown in FIG. 7b, the wheels 20 have grooves 20a on the running faces, respectively, and the lower wires 53 are fitted in the grooves 20a to be able to run on the lower wires 53. As shown in FIG. 7c, the wheels each have a stopper 22 for preventing disengagement thereof from the lower wire 53. Further, the wheels 20 are constructed so as to be detachable.

After the mounting of the rail 9 is completed in the manner as above, the inspection apparatus 7 is mounted on one end of the rail 9 at step S4 in FIG. 1. Here, the one end means one end on the side opposite to the side on which the horizontal portion of the reactor pressure vessel drain piping 4 extends, in the case of FIG. 3a, the one end is a left side end.

The inspection apparatus 7 is connected to a control apparatus 49 installed outside the pedestal 2 by cables 29 transmitting control signals. The control apparatus 49 comprises a monitor, an arithmetic unit, a remote operation panel, a memory, etc. The control apparatus 49 can effect remote operation of the inspection apparatus 7 and store data obtained through inspection.

In this manner, under the condition that nuclear fuels are taken out from the reactor pressure vessel 1, a mounting operation of the rail 9 and the inspection apparatus 7 is practiced at the peripheral portion inside the pedestal 2, whereby radiation exposure to the inspectorl can be reduced.

Figure 8A:
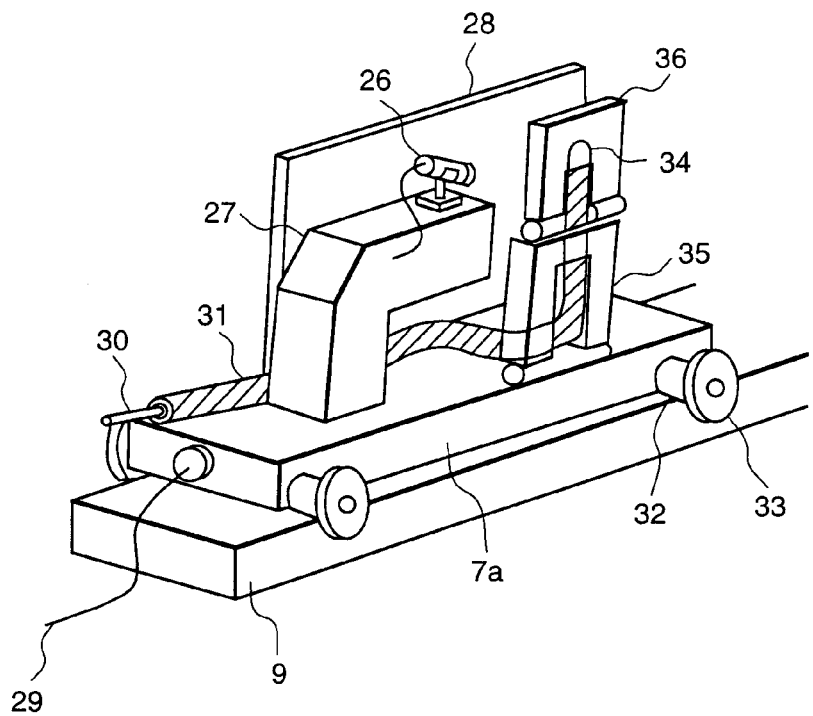
FIG. 8a is a rough perspective view of an inspection apparatus in which a RT method is used.

Next, at step S5 in FIG. 1, the inspection apparatus 7 is moved to a prescribed position on the rail 9 by driving a drive motor built in the inspection apparatus 7. As shown in FIG. 8a, the inspection apparatus 7 has a CCD camera 26 mounted thereon, and images taken by the CCD camera 26 are displayed on the monitor of the control apparatus 49 as images. Since a position around an object or part to be inspected is directly confirmed by the monitor images, it is possible to move the inspection apparatus 7 to an appropriate position. The inspection apparatus 7 is moved by the remote operation panel of the control apparatus 49 until the reactor pressure vessel drain piping contacts with a tip portion of a positioning plate 27 provided on the inspection apparatus 7.

In this case, since it is necessary to contact the positioning plate 27 to the elbow portion of the reactor pressure vessel drain piping 4, only the elbow portion is inspected. However, the inspection apparatus 7 can be moved to the horizontal portion of the reactor pressure vessel drain piping 4 by removing the positioning plate 27 mounted on the inspection apparatus 7 and monitoring by the CCD camera 26, so that it is possible to inspect the horizontal portion. Further, since the wheels 32 of the inspection apparatus 7 are constructed so as to be detachable, they can be mounted or dismounted according to the plate type or wire type rail 9.

Next, after the inspection apparatus 7 is moved to a prescribed position by remote operation of the remote operation panel, the reactor pressure vessel drain piping 4 is inspected at step S6 in FIG. 1. As an inspection method, the above-mentioned two methods of RT and UT can be used. Here, the principle of each of RT and UT is explained briefly.

In the case of RT, radiations are emitted from a radiation source and impinge on an object to be inspected. A part of the radiations reflects on the object, but another part passes through the object and projects on a screen disposed on the opposite side to the radiation source. Since the radiations have property reflation factor or transmission factor changes according to difference in material of the object, a transmission image of the object is projected on the film. Thickness of the object is obtained on the basis of the transmission image.

Next, the method of UT is explained. This is measurement by difference in time required for reciprocation of ultrasonic pulses in the object. A part of ultrasonic pulses oscillated from a ultrasonic probe reflects on a surface of the object (surface echo), the remaining is reflected on the rear surface (rear surface echo) and they are received by the ultrasonic probe. The thickness of the object is obtained from difference in time required for reaching the ultrasonic probe of the surface echo and the rear surface echo at this time.

Figure 8B:
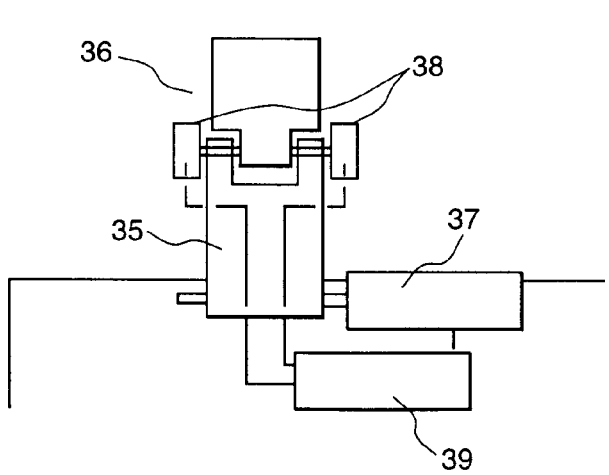
Figure 8C:
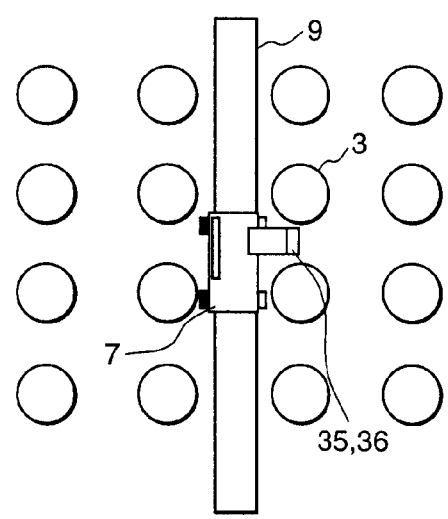
Figure 9:
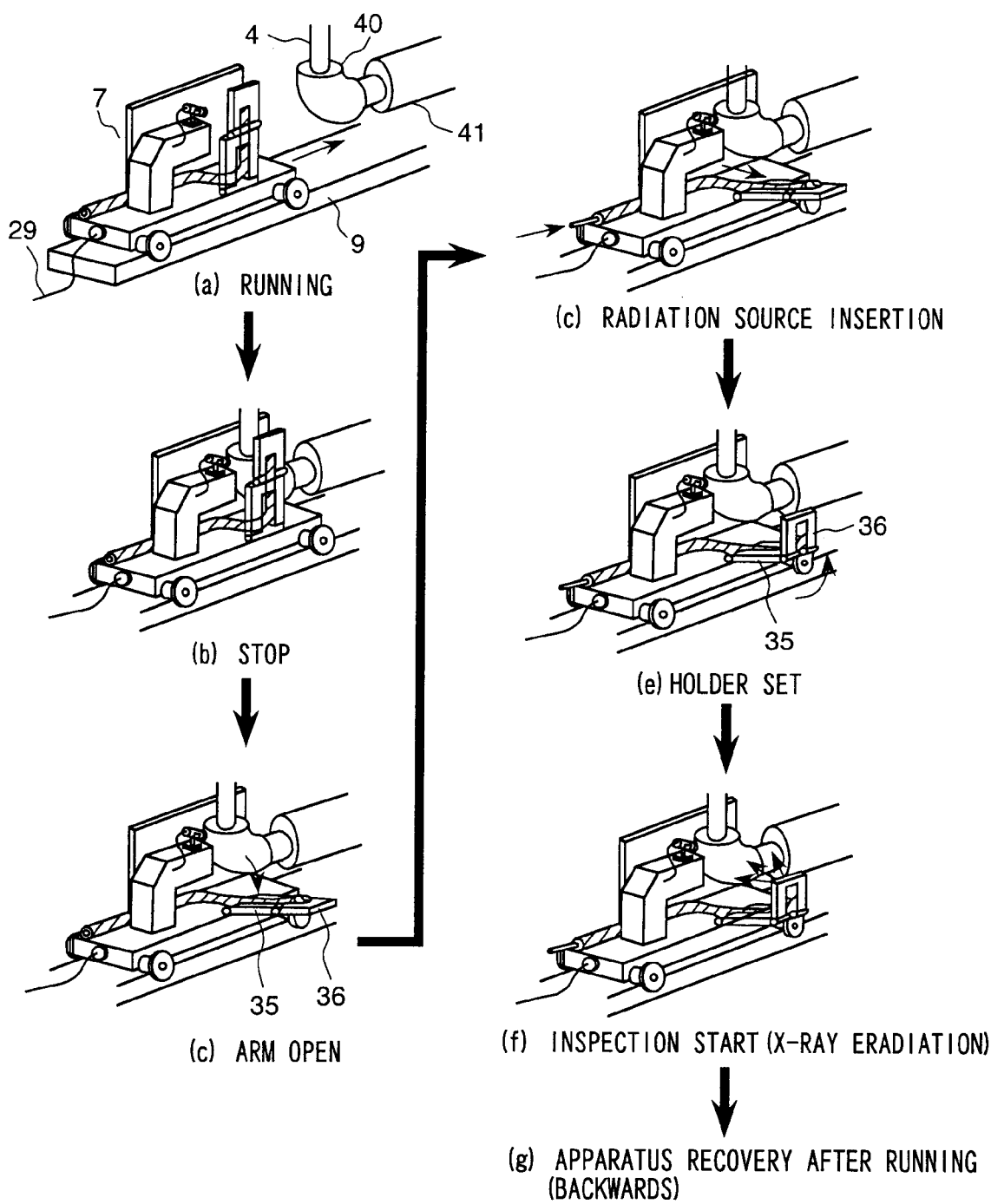
FIG. 9 is views showing main inspection procedures of inspection method using the RT method.

Here, an example of a rough construction and its principal operation of the inspection apparatus 7 using the RT method is explained, referring to FIGS. 8a to 8c and FIG. 9. FIGS. 8a to 8c each are a view of a rough construction of the inspection apparatus 7 and FIG. 9 is perspective views showing main procedures of an inspection method.

As shown in FIGS. 8a to 8c, this inspection apparatus 7 is provided, as a RT apparatus unit, with a film 28, a radiation source transmission tube 30, a radiation source cable 31, an arm 35, a radiation source holder 36, actuators 37 and 38, a control apparatus 39, etc. The RT apparatus unit is mounted on the carriage 7a, but it is omitted in part in FIGS. 8a to 8c.

In FIG. 9(a), the inspection apparatus 7 with this construction is run on the rail 9, and stopped at a prescribed position in FIG. 9(b). In FIG. 9(c), the arm 35 is opened by the actuator 37, and the radiation source holder 36 is opened by the actuator 38. In FIG. 9(d), the radiation source is sent out to the top portion 34 through the radiation source transmitting tube 30 embraced by the radiation source cable 31. In FIG. 9(e), only the radiation source holder 38 is set up vertically.

Next, in FIG. 9(f), the elbow portion of the reactor pressure vessel drain piping 4 is inspected by radiating radiations (X-rays) from the radiation source disposed on the top 34. Radiation radiated from the radiation source pass through the elbow and project on a film 28 provided on the opposite side. In this case, the reason why the arm 35 is extended horizontally is to secure a distance of some extent between the radiation source and the elbow (an object to be inspected). This is because when the distance between the radiation source and the object to be inspected is too small, the radiations emitted from the point-like radiation source impinge on the object to be inspected before sufficiently dispersing spreading and an inspection range becomes small.

In this manner, the reactor pressure vessel drain piping 4 can be surely inspected by moving the inspection apparatus 7 to the elbow of the reactor pressure vessel drain piping 4 along the rail mounted under the reactor pressure vessel drain piping 4 in parallel with the horizontal portion of the drain piping 4.

After the above-mentioned taking picture is finished, in FIG. 9(g), the inspection apparatus is moved to the original position, removed from the rail 9 and recovered. FIG. 9(g) corresponds to steps S7 and S8 in FIG. 1. The above all the procedures in FIGS. 9 (a) to (g) are practiced in remote operation by the remote operation panel of the control apparatus 49 through the cable 29. After recovering of the inspection apparatus 7, development treatment of the film is carried out, and thickness conversion is calculated. The thickness conversion is a ratio that the thickness value obtained from the film 28 is divided by the thickness value of piping of standard. In this case, it is possible to watch the condition of the interior. It also is possible to effect the thickness measurement of the piping along the axis of the piping and the condition of the interior at the same time.

Next, in FIG. 1, the rail is removed at step S9, the nuclear fuels are refueled from the nuclear fuel pool into the reactor pressure vessel 1 at step S10 and the nuclear reactor is restarted at step S11. A series of inspection works is completed by the steps 1 to 11.

By the way, as shown in FIG. 8c, in the case where the arm 35 and the radiation source holder 36 are horizontal, the control rod drive housings 3 become a bar, so that the inspection apparatus 7 can not be recovered. Therefore, the inspection apparatus has the control apparatus 39 provided thereon. That is, in the case where the arm 35 and the radiation source holder 36 can not be folded by remote operation because of disorder in the electric power supply, etc., the control apparatus 39 actuates the actuators 37 and 38 to automatically fold the arm 35 and the radiation source holder 36, whereby the inspection apparatus 7 can be recovered.

Figure 10A:
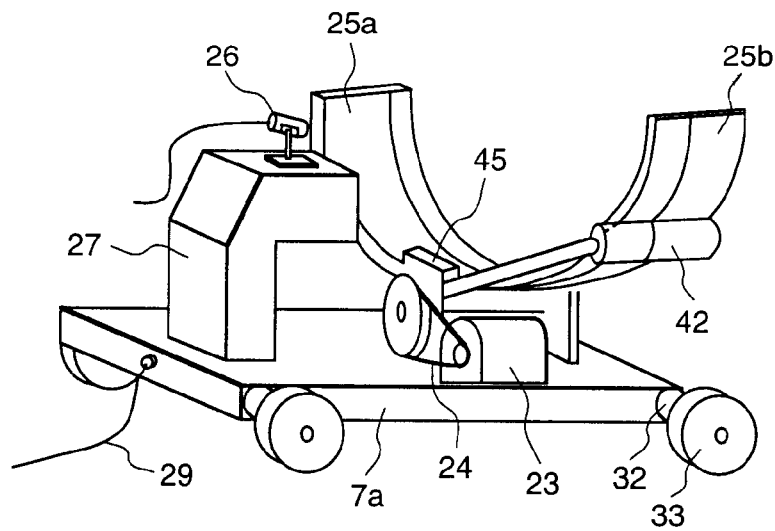
FIG. 10a is a rough perspective view of an inspection apparatus in which the UT method is applied.
Figure 10B:
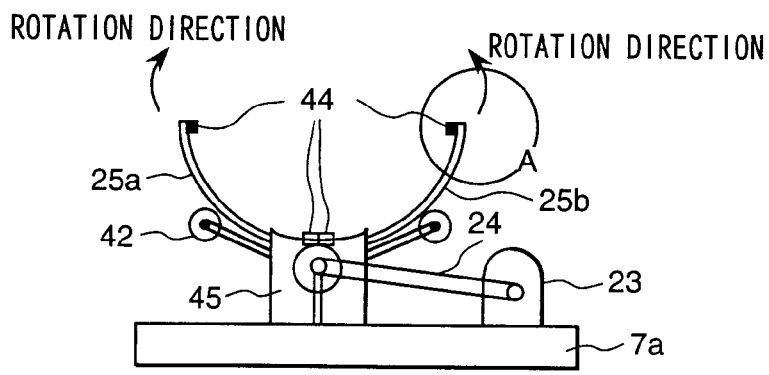
Figure 10C:
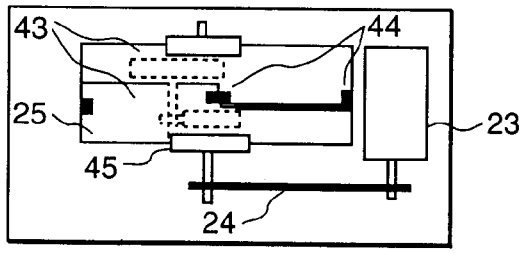

Next, an example using the UT method is explained, referring to FIGS. 10a to 10d. FIGS. 10a to 10d are rough construction views of an inspection apparatus 7 in which the UT method is used. As shown in FIGS. 10a to 10c, this inspection apparatus 7 is provided with a frame 25 formed by flames 25a and 25b each mounting an ultrasonic probe 44 thereon, rollers 42, a gear 43, a retainer 45, a rotation driving motor 23, a belt 24, etc, as an UT apparatus unit. The UT apparatus unit is constructed so that it can be detachable by one touch.

In this inspection apparatus, also, a positioning plate 27 and a CCD camera 26 are mounted, and it is possible to surely determine the position of piping to be inspected in the same manner as in the RT apparatus unit. The construction of a carriage 7a is the same as in FIGS. 8a to 8c, so that its explanation is omitted here.

The frame 25 is composed of two members (the frames) each of which has a half-circular section, supported by the retainer 45. The frame 25 has a groove formed on the outer side, and it also is supported by the rollers 42. The gear 43 is attached to the lower portion of the frame 25, the two frames 25a and 25b are rotated in an opposite direction (peripheral direction) to each other by a gear train including the gear 43. The gear 43 is driven by the rotation drive motor 23 through the belt 24. The rotation drive motor 23 can be remotely operated by a remote operation panel 49 through the cable 29.

Figure 10D:
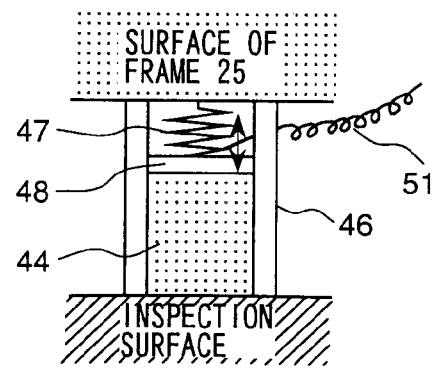

The frames 25a and 25b each have the two ultrasonic probes 44 arranged thereon as shown in FIGS. 10b and 10c. With this arrangement of the ultrasonic probes 44, it is possible to inspect the whole periphery of the piping by rotating 90° the frames 25a and 25b in the peripheral direction. FIG. 10d is an enlarged view of the ultrasonic probe 44. As shown in FIG. 10d, a spring 47, an intermediate plate 48 and the ultrasonic probe 44 are arranged in a case 46. The movable intermediate plate 48 is pressing the ultrasonic probe 44 by elastic force of the spring 47. Thereby, the ultrasonic probe 44 can be always in intimate contact with an inspection surface.

Inspection of piping using this apparatus is practiced by the following procedures.

First, at the position of FIGS. 10b and 10c, reflection signals from the piping are detected by the ultrasonic probes 44. The detected signals (reflection signals) detected through a signal line 51 are stored in the memory of the control apparatus 49 through the cable 29. Next, the frames 25a and 25b are rotated same angles in the peripheral directions opposite to each other, respectively, to inspect the piping in the same manner. The inspection is repeated until the rotation angle of each frame 25a, 25b reaches to 90°. The detection signals stored in the memory in this manner are rearranged so as to correspond to peripheral positions of angles 0°–360°, whereby it is possible to obtain section information of piping thickness in the peripheral direction.

Those procedures correspond to step S6 in FIG. 6. Steps S1–S5, S7–S11 are the same as in the RT method, so that their explanation is omitted here.

Figure 11A:
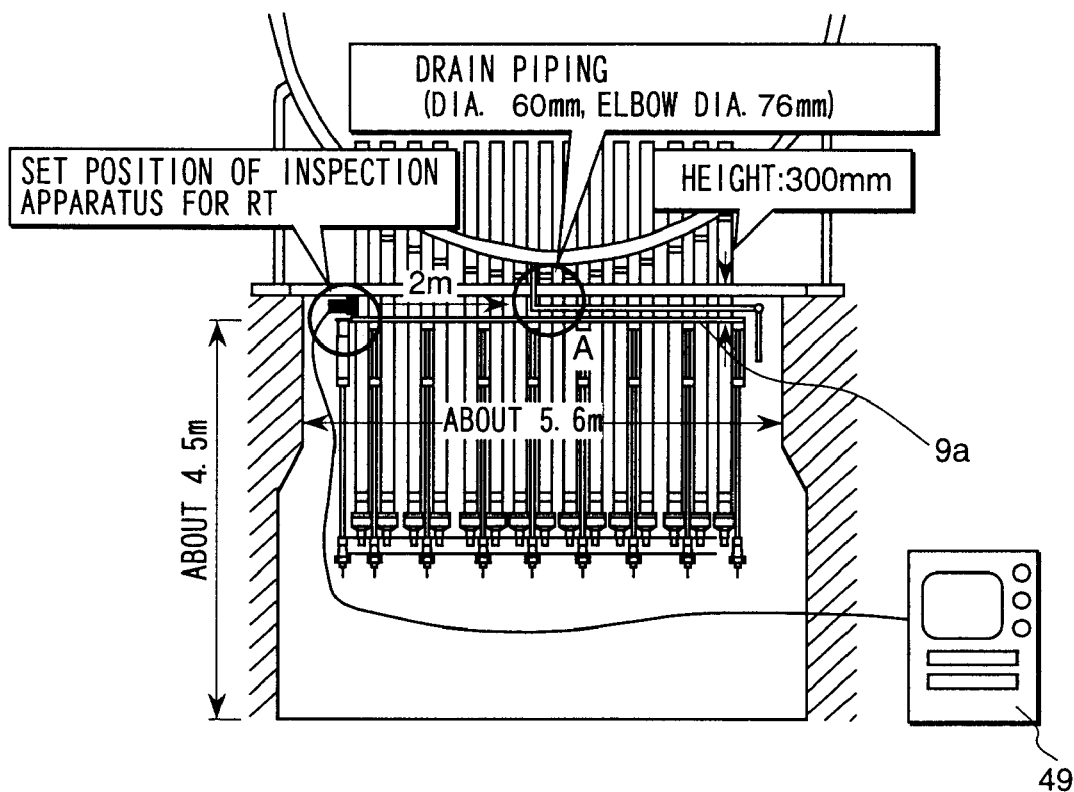
FIG. 11a is a rough vertical sectional view of the inside of a pedestal in which beams exist.
Figure 11B:
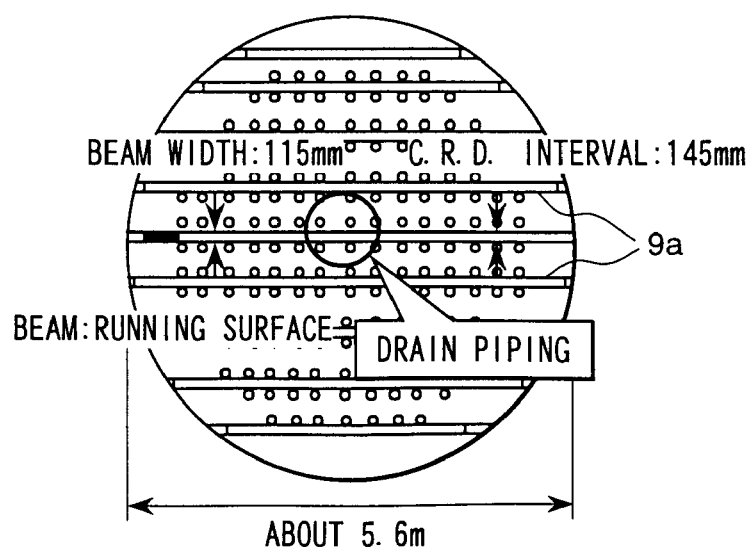

In. a real nuclear reactor, in some cases, a beam corresponding to the rail 9 in FIG. 3 exist originally. An example of such a case is shown in FIGS. 11*a* and 11*b*. FIG. 11*a* is a rough vertical sectional view of the inside of a pedestal in which beams exist, and FIG. 11*b* is a plan view of FIG. 11*a*. In this case as shown in FIG. 11*a,* the beams 9*a* are positioned at a lower side of the reactor pressure vessel drain piping 4. Further, as shown in FIG. 11*b,* the plurality of beams 9*a* are arranged in the horizontal portion of the reactor pressure vessel drain piping 4 in parallel with each other. The width of each beam 9 is about 115 mm, for instance.

In this case, since the works in steps S3*a* nd S9 can be omitted, inspection working of the reactor pressure vessel drain piping can be further simplified. Further, by providing the inspection apparatus 7 with the falling prevention mechanism such as the auxiliary wheels 33 as shown in FIG. 8, there is no fear that the inspection apparatus 7 is fallen from the beam 9*a* by only disposing the inspection apparatus 7 on the beam 9*a*. Further, once the inspection apparatus 7 is installed on the beam 9*a,* in some cases, it is unnecessary to remove the inspection apparatus 7 from the beam 9*a* even after finishing of the inspection. In this case, when the reactor pressure vessel drain piping is inspected next or later, inspection can be effected under the condition that the nuclear fuels are loaded. That is, the inspection working can be further simplified.

By using the above-mentioned method, an inspection of drain piping inside the pedestal 2, which has been impossible, becomes possible, and it can be greatly contributed to protection and maintenance of piping.

What is claimed is:

1. An inspection method of piping, comprising:

taking out nuclear fuels from a nuclear reactor pressure vessel;

mounting a rail for running under reactor pressure vessel drain piping in parallel with a horizontal portion of said reactor pressure vessel drain piping inside a pedestal positioned on the lower side of said reactor pressure vessel;

mounting an inspection apparatus on said rail; and moving said inspection apparatus along said rail to inspect said reactor pressure vessel drain piping.

2. An inspection method of piping according to claim 1, wherein said rail is mounted at a peripheral portion inside said pedestal.

3. An inspection method of piping according to claim 1, wherein said inspection apparatus is provided with a mechanism for preventing said inspection apparatus from being fallen from said rail.

4. An inspection method of piping according to claim 1, wherein said rail is fixed to control rod drive housings.

* * * * *